(12) United States Patent
Li

(10) Patent No.: US 10,924,423 B2
(45) Date of Patent: Feb. 16, 2021

(54) ADAPTIVE MECHANISM TO ADJUST UDT PACKET SIZE BASED ON ACTUAL NETWORK CONDITION

(71) Applicant: Citrix Systems, Inc., Fort Lauderdale, FL (US)

(72) Inventor: Jin Li, Nanjing (CN)

(73) Assignee: Citrix Systems, Inc., Fort Lauderdale, FL (US)

( * ) Notice: Subject to any disclaimer, the term of this patent is extended or adjusted under 35 U.S.C. 154(b) by 136 days.

(21) Appl. No.: 16/372,712

(22) Filed: Apr. 2, 2019

(65) Prior Publication Data

US 2020/0322277 A1 Oct. 8, 2020

(51) Int. Cl.
*H04L 12/805* (2013.01)
*H04L 29/06* (2006.01)
*H04L 1/00* (2006.01)
*H04L 5/00* (2006.01)

(52) U.S. Cl.
CPC .......... *H04L 47/365* (2013.01); *H04L 1/0007* (2013.01); *H04L 5/0055* (2013.01); *H04L 65/80* (2013.01)

(58) Field of Classification Search
CPC . H04W 28/06; H04W 72/0406; H04W 76/20; H04W 28/10; H04W 72/1242
See application file for complete search history.

(56) References Cited

U.S. PATENT DOCUMENTS

| | | | |
|---|---|---|---|
| 6,452,915 B1* | 9/2002 | Jorgensen | H04L 1/20 370/338 |
| 2007/0091810 A1* | 4/2007 | Kim | H04L 1/1635 370/236 |
| 2010/0208655 A1* | 8/2010 | Kim | H04L 1/0079 370/328 |
| 2014/0105120 A1* | 4/2014 | Jose | H04B 7/0619 370/329 |
| 2016/0309420 A1* | 10/2016 | Verma | H04L 1/0034 |
| 2017/0280353 A1* | 9/2017 | Chauhan | H04W 28/06 |
| 2019/0208655 A1* | 7/2019 | Schafer | G09F 9/33 |
| 2020/0112927 A1* | 4/2020 | Han | H04W 72/1205 |

* cited by examiner

*Primary Examiner* — Mewale A Ambaye
(74) *Attorney, Agent, or Firm* — Foley & Lardner LLP

(57) ABSTRACT

Described embodiments provide systems and methods for adaptive packet size adjustment for UDT or similar protocols, responsive to actual network conditions. Upon detection of a 'black hole' or a size or range of sizes of packets that are repeatedly lost, the system may subdivide packets matching the size or range into smaller subpackets. The receiving device may receive each subpacket and reassemble the original packet, allowing successful communication. Other packets, both smaller and larger than the identified size or range, may be transmitted normally, avoiding drastic reductions to congestion windows or application of other congestion avoidance features, or reducing the MTU value to avoid the 'black hole' range while sacrificing overall useable bandwidth. As a result, the system may more efficiently and reliably communicate large data payloads.

18 Claims, 8 Drawing Sheets

ADAPTIVE MECHANISM TO ADJUST UDT PACKET SIZE BASED ON ACTUAL NETWORK CONDITION

FIELD OF THE DISCLOSURE

The present application generally relates to network communications, including but not limited to systems and methods for adaptive adjustment of user datagram protocol (UDP)-based data transfer (UDT) protocol packet sizes based on network conditions.

BACKGROUND

The user datagram protocol (UDP)-based data transfer (UDT) protocol is typically used for large data transfers over high speed or long distance networks, for which standard transport control protocols (TCP) do not scale well, particularly in high bandwidth-delay product (BDP) environments. UDT protocols make more effective use of the available bandwidth in such instances, but have some drawbacks. Specifically, some packet sizes of UDT packets may be dropped or lost in transmit due to various filtering or other policy rules applied by intermediary devices, such as proxies or virtual private network (VPN) gateways. These dropped packet sizes may be smaller than a maximum transmission unit (MTU) of the connection, and larger packets may be communicated successfully; hence, limiting the MTU to a value smaller than the dropped packet size may significantly limit the potential usable bandwidth of the connection. Furthermore, smaller keep-alive packets may be successfully communicated, leading to an illusion that the network path is able to transport all packet sizes below the MTU value. Because UDT implements reliability protocols, dropped packets may result in repeated retransmissions, delaying data transfer. Furthermore, because the retransmitted packets may be the same size as the initially dropped packets and fall into the same 'black hole' being similarly dropped by the affected intermediary device, retransmissions may be unsuccessful and data transfers may fail.

SUMMARY

This Summary is provided to introduce a selection of concepts in a simplified form that are further described below in the Detailed Description. This Summary is not intended to identify key features or essential features, nor is it intended to limit the scope of the claims included herewith.

To address the deficiencies noted above, in some implementations, a system may implement adaptive packet size adjustment for UDT or similar protocols, responsive to actual network conditions. Upon detection of a 'black hole' or a size or range of sizes of packets that are repeatedly lost, the system may subdivide packets matching the size or range into smaller subpackets. The receiving device may receive each subpacket and reassemble the original packet, allowing successful communication. Other packets, both smaller and larger than the identified size or range, may be transmitted normally, avoiding drastic reductions to congestion windows or application of other congestion avoidance features, or reducing the MTU value to avoid the 'black hole' range while sacrificing overall useable bandwidth. As a result, the system may more efficiently and reliably communicate large data payloads.

In one aspect, the present disclosure is directed to a method for adaptive packet sizing. The method includes transmitting, by a first device to a second device, a first packet having a first size. The method also includes receiving, by the first device from the second device, a negative acknowledgement for the first packet. The method also includes determining, by the first device, that a number of received negative acknowledgements for the first packet exceeds a threshold. The method also includes adding, by the first device, a first size window corresponding to the first size to a transmission filter, the transmission filter preventing transmission of packets having a size corresponding to the first size window.

In some implementations, the method includes generating, by the first device, a first subpacket and a second subpacket from the first packet, responsive to determining that the number of received negative acknowledgements for the first packet exceeds the threshold; and transmitting, by the first device to the second device, the first subpacket and the second subpacket. In a further implementation, the method includes receiving, by the first device from the second device, an acknowledgement sent responsive to receipt of the first subpacket and the second subpacket; and adding the first size window to the transmission filter is performed responsive to receipt of the acknowledgement sent responsive to receipt of the first subpacket and the second subpacket. In a still further implementation, the acknowledgement includes a sequence number of the first packet. In a yet still further implementation, generating the first subpacket and the second subpacket each further comprise generating a subpacket comprising a portion of a payload the first packet, a sequence number of the first packet, and a subpacket index value.

In some implementations, the method includes receiving, by the first device, a second packet having a second size corresponding to the first size window; generating, by the first device, a first subpacket and a second subpacket from the second packet, responsive to the transmission filter including the first size window corresponding to the second size; and transmitting, by the first device to the second device, the first subpacket and the second subpacket.

In some implementations, the first size window comprises the first size plus and minus a predetermined offset size. In some implementations, the first packet comprises a user datagram protocol (UDP)-based data transfer protocol (UDT) packet. In some implementations, the first size is less than a maximum transmission unit (MTU) size of a connection between the first device and the second device.

In another aspect, the present disclosure is directed to a system for adaptive packet sizing. The system includes a first device comprising a network interface in communication with a second device, and a memory device comprising a transmission filter. The first device is configured to: transmit, to the second device via the network interface, a first packet having a first size; receive, from the second device, a negative acknowledgement for the first packet; determine that a number of received negative acknowledgements for the first packet exceeds a threshold; and add a first size window corresponding to the first size to the transmission filter, the transmission filter preventing transmission of packets having a size corresponding to the first size window.

In some implementations, the first device is further configured to generate a first subpacket and a second subpacket from the first packet, responsive to determining that the number of received negative acknowledgements for the first packet exceeds the threshold; and transmit, to the second device, the first subpacket and the second subpacket. In a further implementation, the first device is further configured to receive, from the second device, an acknowledgement sent responsive to receipt of the first subpacket and the second subpacket; and add the first size window to the transmission filter responsive to receipt of the acknowledgement sent responsive to receipt of the first subpacket and the second subpacket. In a yet further implementation, the acknowledgement includes a sequence number of the first packet. In a still yet further implementation, the first device is further configured to generate each of the first subpacket and the second subpacket by generating a subpacket comprising a portion of a payload the first packet, a sequence number of the first packet, and a subpacket index value.

In some implementations, the first device is further configured to receive a second packet having a second size corresponding to the first size window; generate a first subpacket and a second subpacket from the second packet, responsive to the transmission filter including the first size window corresponding to the second size; and transmit, to the second device, the first subpacket and the second subpacket.

In some implementations, the first size window comprises the first size plus and minus a predetermined offset size. In some implementations, the first packet comprises a user datagram protocol (UDP)-based data transfer protocol (UDT) packet. In some implementations, the first size is less than a maximum transmission unit (MTU) size of a connection between the first device and the second device.

In still another aspect, the present disclosure is directed to a method for adaptive packet sizing. The method includes determining, by a first device, that a transmission of a first packet from a second device to the first device has not been received, the first packet having a first sequence number. The method also includes transmitting, by the first device to the second device, a negative acknowledgement comprising the first sequence number. The method also includes receiving, by the first device from the second device, a first subpacket and a second subpacket generated from the first packet, each of the first subpacket and the second subpacket comprising the first sequence number and a subpacket index value. The method also includes reassembling the first packet, by the first device, from the first subpacket and the second subpacket according to the subpacket index value of each subpacket. The method also includes responsive to reassembling the first packet, transmitting, by the first device to the second device, an acknowledgement comprising the first sequence number. Receipt of the acknowledgment comprising the first sequence number causes the second device to add a first size window corresponding to a size of the first packet to a transmission filter.

In some implementations, the method includes receiving, by the first device from the second device, a third subpacket and a fourth subpacket generated from a second packet not previously transmitted from the second device, each of the third subpacket and the fourth subpacket comprising a second sequence number and a subpacket index value, the second packet having a size corresponding to the first size window. The method includes reassembling the second packet, by the first device, from the third subpacket and the fourth subpacket according to the subpacket index value of each subpacket; and responsive to reassembling the second packet, transmitting, by the first device to the second device, an acknowledgement comprising the second sequence number.

BRIEF DESCRIPTION OF THE DRAWING FIGURES

Objects, aspects, features, and advantages of embodiments disclosed herein will become more fully apparent from the following detailed description, the appended claims, and the accompanying drawing figures in which like reference numerals identify similar or identical elements. Reference numerals that are introduced in the specification in association with a drawing figure may be repeated in one or more subsequent figures without additional description in the specification in order to provide context for other features, and not every element may be labeled in every figure. The drawing figures are not necessarily to scale, emphasis instead being placed upon illustrating embodiments, principles and concepts. The drawings are not intended to limit the scope of the claims included herewith.

DETAILED DESCRIPTION

For purposes of reading the description of the various embodiments below, the following descriptions of the sections of the specification and their respective contents may be helpful:

Section A describes a network environment and computing environment which may be useful for practicing embodiments described herein;

Section B describes embodiments of systems and methods for delivering a computing environment to a remote user;

Section C describes embodiments of systems and methods for virtualizing an application delivery controller;

Section D describes embodiments of systems and methods for providing a clustered appliance architecture environment; and Section E describes systems and methods for adaptive adjustment of UDT packet sizes based on network conditions.

A. Network and Computing Environment

Figure 1A:
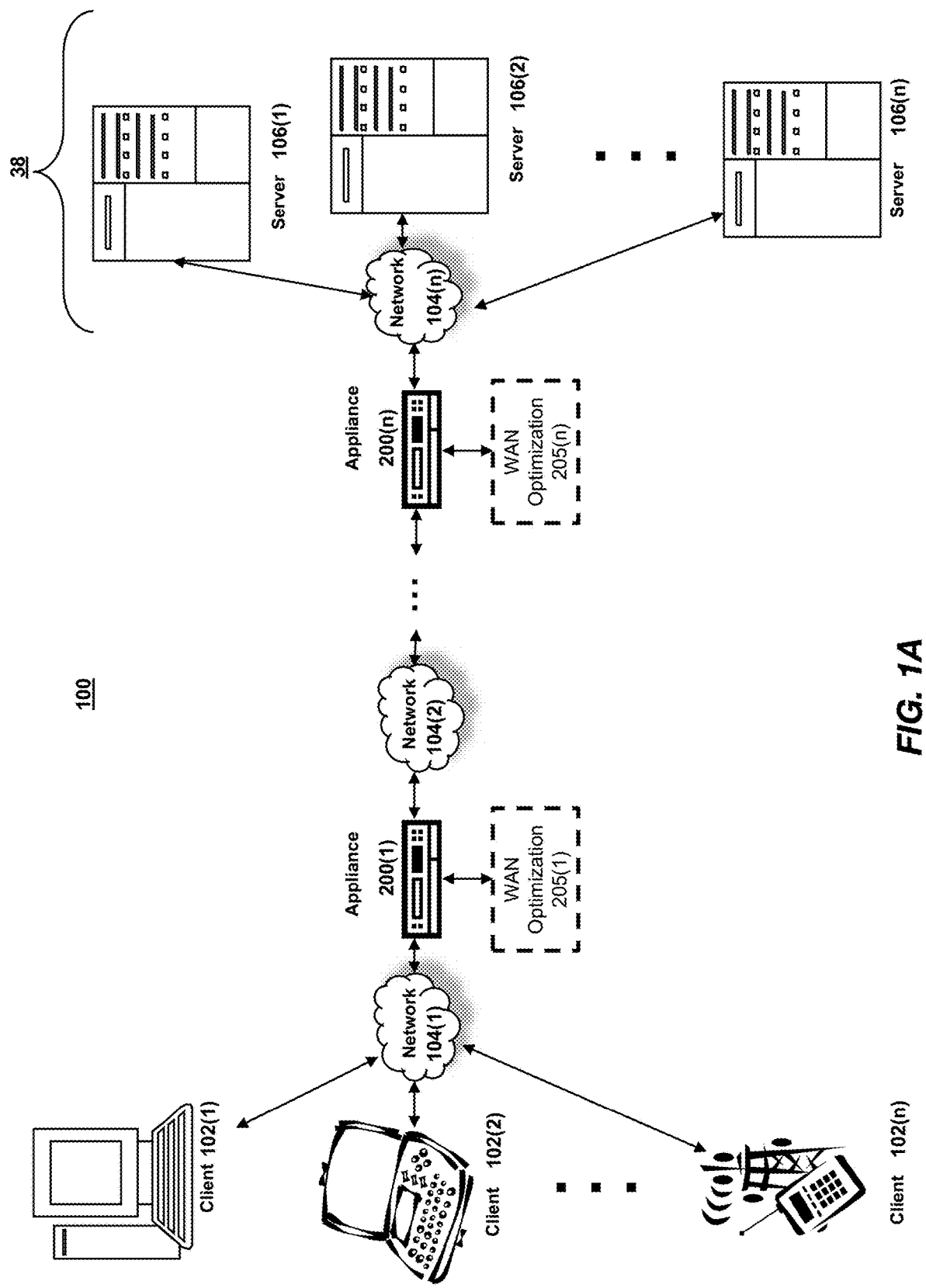
FIG. 1A is a block diagram of a network computing system, in accordance with an illustrative embodiment.

Referring to FIG. 1A, an illustrative network environment 100 is depicted. Network environment 100 may include one or more clients 102(1)-102(n) (also generally referred to as local machine(s) 102 or client(s) 102) in communication with one or more servers 106(1)-106(n) (also generally referred to as remote machine(s) 106 or server(s) 106) via one or more networks 104(1)-104n (generally referred to as network(s) 104). In some embodiments, a client 102 may communicate with a server 106 via one or more appliances 200(1)-200n (generally referred to as appliance(s) 200 or gateway(s) 200).

Although the embodiment shown in FIG. 1A shows one or more networks 104 between clients 102 and servers 106, in other embodiments, clients 102 and servers 106 may be on the same network 104. The various networks 104 may be the same type of network or different types of networks. For example, in some embodiments, network 104(1) may be a private network such as a local area network (LAN) or a company Intranet, while network 104(2) and/or network 104(n) may be a public network, such as a wide area network (WAN) or the Internet. In other embodiments, both network 104(1) and network 104(n) may be private networks. Networks 104 may employ one or more types of physical networks and/or network topologies, such as wired and/or wireless networks, and may employ one or more communication transport protocols, such as transmission control protocol (TCP), internet protocol (IP), user datagram protocol (UDP) or other similar protocols.

As shown in FIG. 1A, one or more appliances 200 may be located at various points or in various communication paths of network environment 100. For example, appliance 200 may be deployed between two networks 104(1) and 104(2), and appliances 200 may communicate with one another to work in conjunction to, for example, accelerate network traffic between clients 102 and servers 106. In other embodiments, the appliance 200 may be located on a network 104. For example, appliance 200 may be implemented as part of one of clients 102 and/or servers 106. In an embodiment, appliance 200 may be implemented as a network device such as Citrix networking (formerly NetScaler®) products sold by Citrix Systems, Inc. of Fort Lauderdale, Fla.

As shown in FIG. 1A, one or more servers 106 may operate as a server farm 38. Servers 106 of server farm 38 may be logically grouped, and may either be geographically co-located (e.g., on premises) or geographically dispersed (e.g., cloud based) from clients 102 and/or other servers 106. In an embodiment, server farm 38 executes one or more applications on behalf of one or more of clients 102 (e.g., as an application server), although other uses are possible, such as a file server, gateway server, proxy server, or other similar server uses. Clients 102 may seek access to hosted applications on servers 106.

As shown in FIG. 1A, in some embodiments, appliances 200 may include, be replaced by, or be in communication with, one or more additional appliances, such as WAN optimization appliances 205(1)-205(n), referred to generally as WAN optimization appliance(s) 205. For example, WAN optimization appliance 205 may accelerate, cache, compress or otherwise optimize or improve performance, operation, flow control, or quality of service of network traffic, such as traffic to and/or from a WAN connection, such as optimizing Wide Area File Services (WAFS), accelerating Server Message Block (SMB) or Common Internet File System (CIFS). In some embodiments, appliance 205 may be a performance enhancing proxy or a WAN optimization controller. In one embodiment, appliance 205 may be implemented as Citrix SD-WAN products sold by Citrix Systems, Inc. of Fort Lauderdale, Fla.

Figure 1B:
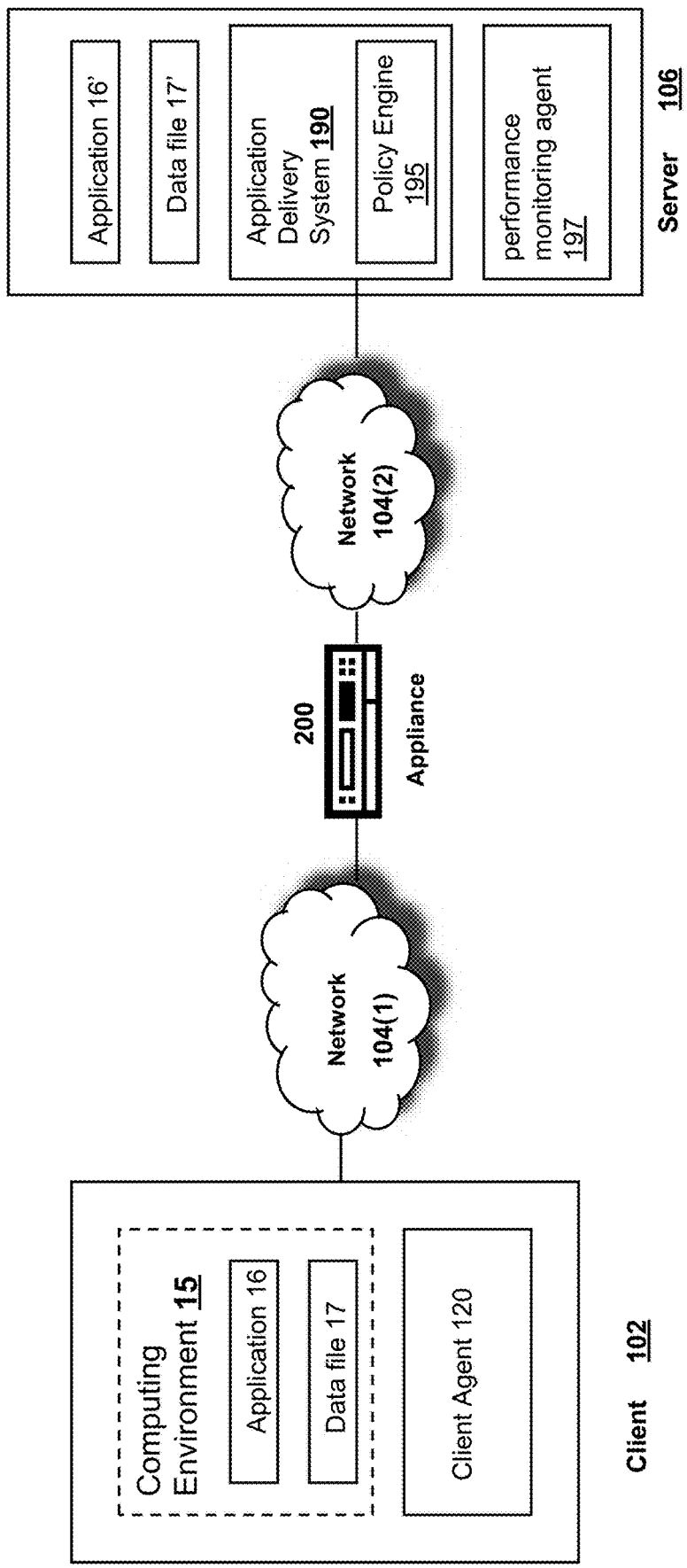
FIG. 1B is a block diagram of a network computing system for delivering a computing environment from a server to a client via an appliance, in accordance with an illustrative embodiment.

Referring to FIG. 1B, an example network environment, 100', for delivering and/or operating a computing network environment on a client 102 is shown. As shown in FIG. 1B, a server 106 may include an application delivery system 190 for delivering a computing environment, application, and/or data files to one or more clients 102. Client 102 may include client agent 120 and computing environment 15. Computing environment 15 may execute or operate an application, 16, that accesses, processes or uses a data file 17. Computing environment 15, application 16 and/or data file 17 may be delivered via appliance 200 and/or the server 106.

Appliance 200 may accelerate delivery of all or a portion of computing environment 15 to a client 102, for example by the application delivery system 190. For example, appliance 200 may accelerate delivery of a streaming application and data file processable by the application from a data center to a remote user location by accelerating transport layer traffic between a client 102 and a server 106. Such acceleration may be provided by one or more techniques, such as: 1) transport layer connection pooling, 2) transport layer connection multiplexing, 3) transport control protocol buffering, 4) compression, 5) caching, or other techniques. Appliance 200 may also provide load balancing of servers 106 to process requests from clients 102, act as a proxy or access server to provide access to the one or more servers 106, provide security and/or act as a firewall between a client 102 and a server 106, provide Domain Name Service (DNS) resolution, provide one or more virtual servers or virtual internet protocol servers, and/or provide a secure virtual private network (VPN) connection from a client 102 to a server 106, such as a secure socket layer (SSL) VPN connection and/or provide encryption and decryption operations.

Application delivery management system 190 may deliver computing environment 15 to a user (e.g., client 102), remote or otherwise, based on authentication and authorization policies applied by policy engine 195. A remote user may obtain a computing environment and access to server stored applications and data files from any network-connected device (e.g., client 102). For example, appliance 200 may request an application and data file from server 106. In response to the request, application delivery system 190 and/or server 106 may deliver the application and data file to client 102, for example via an application stream to operate in computing environment 15 on client 102, or via a remote-display protocol or otherwise via remote-based or server-based computing. In an embodiment, application delivery system 190 may be implemented as any portion of the Citrix Workspace Suite™ by Citrix Systems, Inc., such as Citrix Virtual Apps and Desktops (formerly XenApp® and XenDesktop®).

Policy engine 195 may control and manage the access to, and execution and delivery of, applications. For example, policy engine 195 may determine the one or more applications a user or client 102 may access and/or how the application should be delivered to the user or client 102, such as a server-based computing, streaming or delivering the application locally to the client 120 for local execution.

For example, in operation, a client 102 may request execution of an application (e.g., application 16') and application delivery system 190 of server 106 determines how to execute application 16', for example based upon credentials received from client 102 and a user policy applied by policy engine 195 associated with the credentials. For example, application delivery system 190 may enable client 102 to receive application-output data generated by execution of the application on a server 106, may enable client 102 to execute the application locally after receiving the application from server 106, or may stream the application via network 104 to client 102. For example, in some embodiments, the application may be a server-based or a remote-based application executed on server 106 on behalf of client 102. Server 106 may display output to client 102 using a thin-client or remote-display protocol, such as the Independent Computing Architecture (ICA) protocol by Citrix Systems, Inc. of Fort Lauderdale, Fla. The application may be any application related to real-time data communications, such as applications for streaming graphics, streaming video and/or audio or other data, delivery of remote desktops or workspaces or hosted services or applications, for example infrastructure as a service (IaaS), desktop as a service (DaaS), workspace as a service (WaaS), software as a service (SaaS) or platform as a service (PaaS).

One or more of servers 106 may include a performance monitoring service or agent 197. In some embodiments, a dedicated one or more servers 106 may be employed to perform performance monitoring. Performance monitoring may be performed using data collection, aggregation, analysis, management and reporting, for example by software, hardware or a combination thereof. Performance monitoring may include one or more agents for performing monitoring, measurement and data collection activities on clients 102 (e.g., client agent 120), servers 106 (e.g., agent 197) or an appliance 200 and/or 205 (agent not shown). In general, monitoring agents (e.g., 120 and/or 197) execute transparently (e.g., in the background) to any application and/or user of the device. In some embodiments, monitoring agent 197 includes any of the product embodiments referred to as Citrix Analytics or Citrix Application Delivery Management by Citrix Systems, Inc. of Fort Lauderdale, Fla.

The monitoring agents 120 and 197 may monitor, measure, collect, and/or analyze data on a predetermined frequency, based upon an occurrence of given event(s), or in real time during operation of network environment 100. The monitoring agents may monitor resource consumption and/or performance of hardware, software, and/or communications resources of clients 102, networks 104, appliances 200 and/or 205, and/or servers 106. For example, network connections such as a transport layer connection, network latency, bandwidth utilization, end-user response times, application usage and performance, session connections to an application, cache usage, memory usage, processor usage, storage usage, database transactions, client and/or server utilization, active users, duration of user activity, application crashes, errors, or hangs, the time required to log-in to an application, a server, or the application delivery system, and/or other performance conditions and metrics may be monitored.

The monitoring agents 120 and 197 may provide application performance management for application delivery system 190. For example, based upon one or more monitored performance conditions or metrics, application delivery system 190 may be dynamically adjusted, for example periodically or in real-time, to optimize application delivery by servers 106 to clients 102 based upon network environment performance and conditions.

In described embodiments, clients 102, servers 106, and appliances 200 and 205 may be deployed as and/or executed on any type and form of computing device, such as any desktop computer, laptop computer, or mobile device capable of communication over at least one network and performing the operations described herein. For example, clients 102, servers 106 and/or appliances 200 and 205 may each correspond to one computer, a plurality of computers, or a network of distributed computers such as computer 101 shown in FIG. 1C.

Figure 1C:
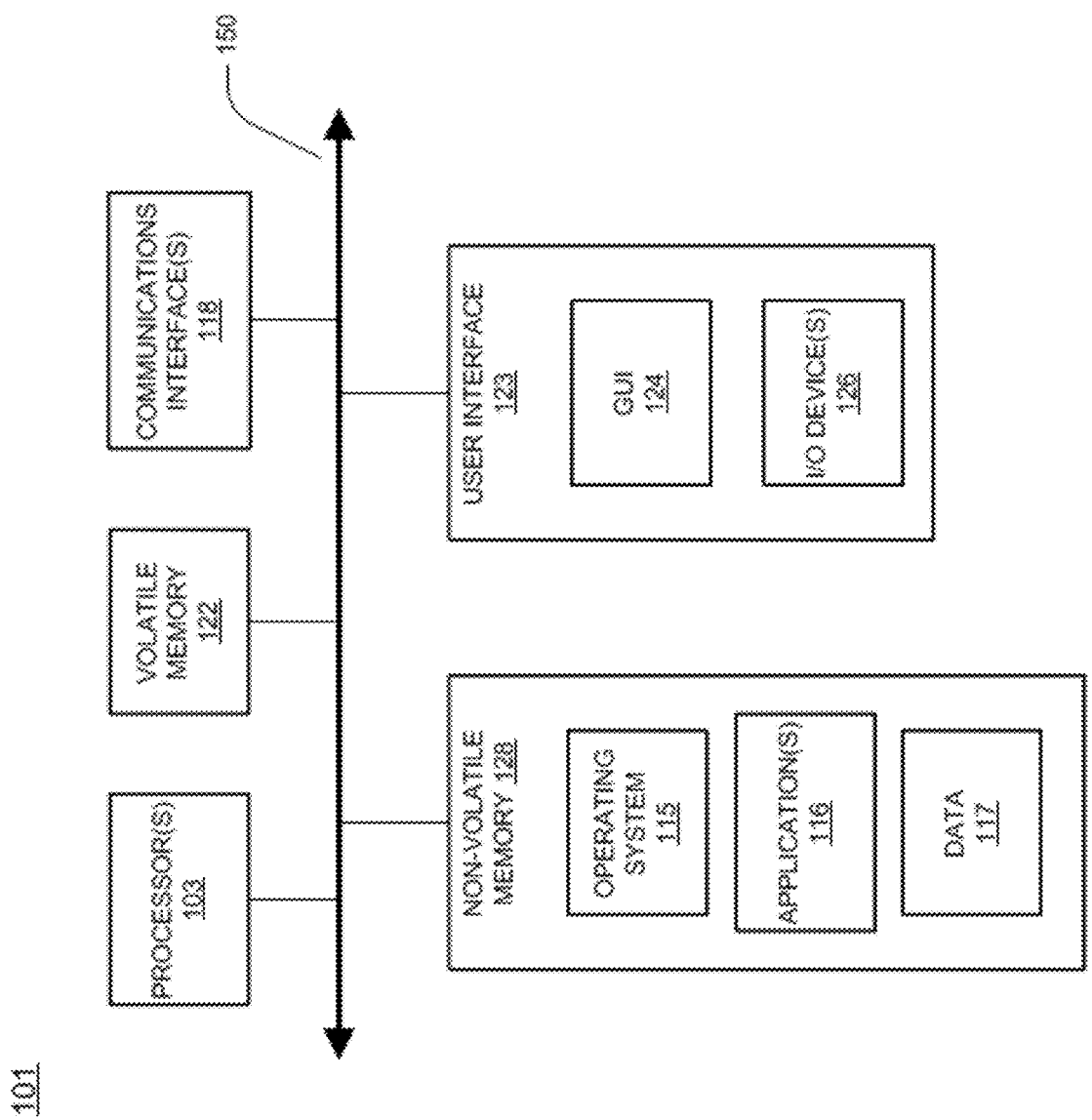
FIG. 1C is a block diagram of a computing device, in accordance with an illustrative embodiment.

As shown in FIG. 1C, computer 101 may include one or more processors 103, volatile memory 122 (e.g., RAM), non-volatile memory 128 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), user interface (UI) 123, one or more communications interfaces 118, and communication bus 150. User interface 123 may include graphical user interface (GUI) 124 (e.g., a touchscreen, a display, etc.) and one or more input/output (I/O) devices 126 (e.g., a mouse, a keyboard, etc.). Non-volatile memory 128 stores operating system 115, one or more applications 116, and data 117 such that, for example, computer instructions of operating system 115 and/or applications 116 are executed by processor(s) 103 out of volatile memory 122. Data may be entered using an input device of GUI 124 or received from I/O device(s) 126. Various elements of computer 101 may communicate via communication bus 150. Computer 101 as shown in FIG. 1C is shown merely as an example, as clients 102, servers 106 and/or appliances 200 and 205 may be implemented by any computing or processing environment and with any type of machine or set of machines that may have suitable hardware and/or software capable of operating as described herein.

Processor(s) 103 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more application specific integrated circuits (ASICs), microprocessors, digital signal processors, microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors.

Communications interfaces 118 may include one or more interfaces to enable computer 101 to access a computer network such as a LAN, a WAN, or the Internet through a variety of wired and/or wireless or cellular connections.

In described embodiments, a first computing device 101 may execute an application on behalf of a user of a client computing device (e.g., a client 102), may execute a virtual machine, which provides an execution session within which applications execute on behalf of a user or a client computing device (e.g., a client 102), such as a hosted desktop session, may execute a terminal services session to provide a hosted desktop environment, or may provide access to a computing environment including one or more of: one or more applications, one or more desktop applications, and one or more desktop sessions in which one or more applications may execute.

Additional details of the implementation and operation of network environment 100, clients 102, servers 106, and appliances 200 and 205 may be as described in U.S. Pat. No. 9,538,345, issued Jan. 3, 2017 to Citrix Systems, Inc. of Fort Lauderdale, Fla., the teachings of which are hereby incorporated herein by reference.

B. Appliance Architecture

Figure 2:
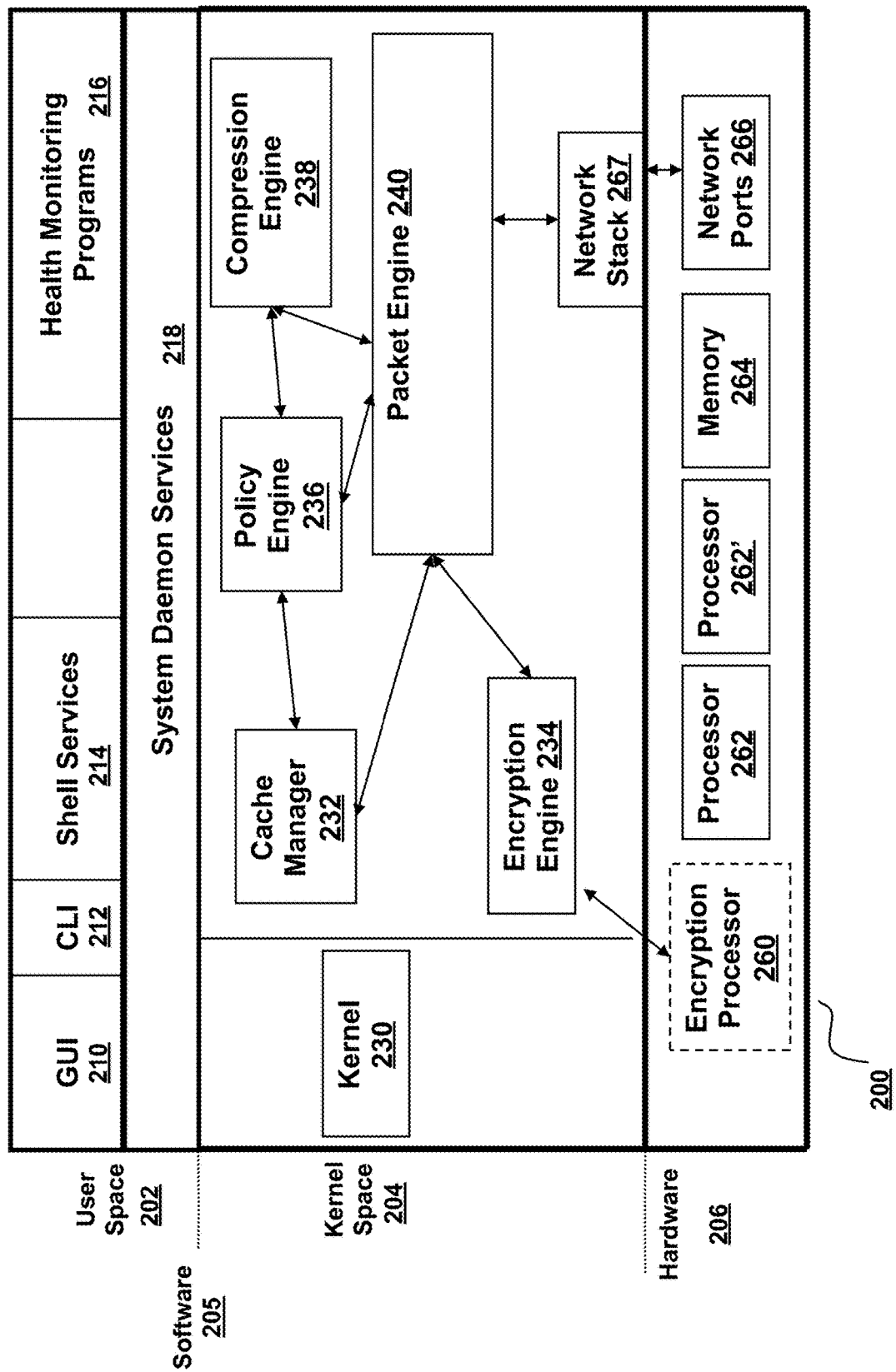
FIG. 2 is a block diagram of an appliance for processing communications between a client and a server, in accordance with an illustrative embodiment.

FIG. 2 shows an example embodiment of appliance 200. As described herein, appliance 200 may be implemented as a server, gateway, router, switch, bridge or other type of computing or network device. As shown in FIG. 2, an embodiment of appliance 200 may include a hardware layer 206 and a software layer 205 divided into a user space 202 and a kernel space 204. Hardware layer 206 provides the hardware elements upon which programs and services within kernel space 204 and user space 202 are executed and allow programs and services within kernel space 204 and user space 202 to communicate data both internally and externally with respect to appliance 200. As shown in FIG. 2, hardware layer 206 may include one or more processing units 262 for executing software programs and services, memory 264 for storing software and data, network ports 266 for transmitting and receiving data over a network, and encryption processor 260 for encrypting and decrypting data such as in relation to Secure Socket Layer (SSL) or Transport Layer Security (TLS) processing of data transmitted and received over the network.

An operating system of appliance 200 allocates, manages, or otherwise segregates the available system memory into kernel space 204 and user space 202. Kernel space 204 is reserved for running kernel 230, including any device drivers, kernel extensions or other kernel related software. As known to those skilled in the art, kernel 230 is the core of the operating system, and provides access, control, and management of resources and hardware-related elements of application 104. Kernel space 204 may also include a number of network services or processes working in conjunction with cache manager 232.

Appliance 200 may include one or more network stacks 267, such as a TCP/IP based stack, for communicating with client(s) 102, server(s) 106, network(s) 104, and/or other appliances 200 or 205. For example, appliance 200 may establish and/or terminate one or more transport layer connections between clients 102 and servers 106. Each network stack 267 may include a buffer 243 for queuing one or more network packets for transmission by appliance 200.

Kernel space 204 may include cache manager 232, packet engine 240, encryption engine 234, policy engine 236 and compression engine 238. In other words, one or more of processes 232, 240, 234, 236 and 238 run in the core address space of the operating system of appliance 200, which may reduce the number of data transactions to and from the memory and/or context switches between kernel mode and user mode, for example since data obtained in kernel mode may not need to be passed or copied to a user process, thread or user level data structure.

Cache manager 232 may duplicate original data stored elsewhere or data previously computed, generated or transmitted to reducing the access time of the data. In some embodiments, the cache memory may be a data object in memory 264 of appliance 200, or may be a physical memory having a faster access time than memory 264.

Policy engine 236 may include a statistical engine or other configuration mechanism to allow a user to identify, specify, define or configure a caching policy and access, control and management of objects, data or content being cached by appliance 200, and define or configure security, network traffic, network access, compression or other functions performed by appliance 200.

Encryption engine 234 may process any security related protocol, such as SSL or TLS. For example, encryption engine 234 may encrypt and decrypt network packets, or any portion thereof, communicated via appliance 200, may setup or establish SSL, TLS or other secure connections, for example between client 102, server 106, and/or other appliances 200 or 205. In some embodiments, encryption engine 234 may use a tunneling protocol to provide a VPN between a client 102 and a server 106. In some embodiments, encryption engine 234 is in communication with encryption processor 260. Compression engine 238 compresses network packets bi-directionally between clients 102 and servers 106 and/or between one or more appliances 200.

Packet engine 240 may manage kernel-level processing of packets received and transmitted by appliance 200 via network stacks 267 to send and receive network packets via network ports 266. Packet engine 240 may operate in conjunction with encryption engine 234, cache manager 232, policy engine 236 and compression engine 238, for example to perform encryption/decryption, traffic management such as request-level content switching and request-level cache redirection, and compression and decompression of data.

User space 202 is a memory area or portion of the operating system used by user mode applications or programs otherwise running in user mode. A user mode application may not access kernel space 204 directly and uses service calls in order to access kernel services. User space 202 may include graphical user interface (GUI) 210, a command line interface (CLI) 212, shell services 214, health monitor 216, and daemon services 218. GUI 210 and CLI 212 enable a system administrator or other user to interact with and control the operation of appliance 200, such as via the operating system of appliance 200. Shell services 214 include the programs, services, tasks, processes or executable instructions to support interaction with appliance 200 by a user via the GUI 210 and/or CLI 212.

Health monitor 216 monitors, checks, reports and ensures that network systems are functioning properly and that users are receiving requested content over a network, for example by monitoring activity of appliance 200. In some embodiments, health monitor 216 intercepts and inspects any network traffic passed via appliance 200. For example, health monitor 216 may interface with one or more of encryption engine 234, cache manager 232, policy engine 236, compression engine 238, packet engine 240, daemon services 218, and shell services 214 to determine a state, status, operating condition, or health of any portion of the appliance 200. Further, health monitor 216 may determine if a program, process, service or task is active and currently running, check status, error or history logs provided by any program, process, service or task to determine any condition, status or error with any portion of appliance 200. Additionally, health monitor 216 may measure and monitor the performance of any application, program, process, service, task or thread executing on appliance 200.

Daemon services 218 are programs that run continuously or in the background and handle periodic service requests received by appliance 200. In some embodiments, a daemon service may forward the requests to other programs or processes, such as another daemon service 218 as appropriate.

As described herein, appliance 200 may relieve servers 106 of much of the processing load caused by repeatedly opening and closing transport layer connections to clients 102 by opening one or more transport layer connections with each server 106 and maintaining these connections to allow repeated data accesses by clients via the Internet (e.g., "connection pooling"). To perform connection pooling, appliance 200 may translate or multiplex communications by modifying sequence numbers and acknowledgment numbers at the transport layer protocol level (e.g., "connection multiplexing"). Appliance 200 may also provide switching or load balancing for communications between the client 102 and server 106.

As described herein, each client 102 may include client agent 120 for establishing and exchanging communications with appliance 200 and/or server 106 via a network 104. Client 102 may have installed and/or execute one or more applications that are in communication with network 104. Client agent 120 may intercept network communications from a network stack used by the one or more applications. For example, client agent 120 may intercept a network communication at any point in a network stack and redirect the network communication to a destination desired, managed or controlled by client agent 120, for example to intercept and redirect a transport layer connection to an IP address and port controlled or managed by client agent 120. Thus, client agent 120 may transparently intercept any protocol layer below the transport layer, such as the network layer, and any protocol layer above the transport layer, such as the session, presentation or application layers. Client agent 120 can interface with the transport layer to secure, optimize, accelerate, route or load-balance any communications provided via any protocol carried by the transport layer.

In some embodiments, client agent 120 is implemented as an Independent Computing Architecture (ICA) client developed by Citrix Systems, Inc. of Fort Lauderdale, Fla. Client agent 120 may perform acceleration, streaming, monitoring, and/or other operations. For example, client agent 120 may accelerate streaming an application from a server 106 to a client 102. Client agent 120 may also perform end-point detection/scanning and collect end-point information about client 102 for appliance 200 and/or server 106. Appliance 200 and/or server 106 may use the collected information to determine and provide access, authentication and authorization control of the client's connection to network 104. For example, client agent 120 may identify and determine one or more client-side attributes, such as: the operating system and/or a version of an operating system, a service pack of the operating system, a running service, a running process, a file, presence or versions of various applications of the client, such as antivirus, firewall, security, and/or other software.

Additional details of the implementation and operation of appliance 200 may be as described in U.S. Pat. No. 9,538,345, issued Jan. 3, 2017 to Citrix Systems, Inc. of Fort Lauderdale, Fla., the teachings of which are hereby incorporated herein by reference.

C. Systems and Methods for Providing Virtualized Application Delivery Controller Referring now to FIG. 3, a block diagram of a virtualized environment 300 is shown. As shown, a computing device 302 in virtualized environment 300 includes a virtualization layer 303, a hypervisor layer 304, and a hardware layer 307. Hypervisor layer 304 includes one or more hypervisors (or virtualization managers) 301 that allocates and manages access to a number of physical resources in hardware layer 307 (e.g., physical processor(s) 321 and physical disk(s) 328) by at least one virtual machine (VM) (e.g., one of VMs 306) executing in virtualization layer 303. Each VM 306 may include allocated virtual resources such as virtual processors 332 and/or virtual disks 342, as well as virtual resources such as virtual memory and virtual network interfaces. In some embodiments, at least one of VMs 306 may include a control operating system (e.g., 305) in communication with hypervisor 301 and used to execute applications for managing and configuring other VMs (e.g., guest operating systems 310) on device 302.

In general, hypervisor(s) 301 may provide virtual resources to an operating system of VMs 306 in any manner that simulates the operating system having access to a physical device. Thus, hypervisor(s) 301 may be used to emulate virtual hardware, partition physical hardware, virtualize physical hardware, and execute virtual machines that provide access to computing environments. In an illustrative embodiment, hypervisor(s) 301 may be implemented as a Citrix Hypervisor by Citrix Systems, Inc. of Fort Lauderdale, Fla. In an illustrative embodiment, device 302 executing a hypervisor that creates a virtual machine platform on which guest operating systems may execute is referred to as a host server. 302

Hypervisor 301 may create one or more VMs 306 in which an operating system (e.g., control operating system 305 and/or guest operating system 310) executes. For example, the hypervisor 301 loads a virtual machine image to create VMs 306 to execute an operating system. Hypervisor 301 may present VMs 306 with an abstraction of hardware layer 307, and/or may control how physical capabilities of hardware layer 307 are presented to VMs 306. For example, hypervisor(s) 301 may manage a pool of resources distributed across multiple physical computing devices.

In some embodiments, one of VMs 306 (e.g., the VM executing control operating system 305) may manage and configure other of VMs 306, for example by managing the execution and/or termination of a VM and/or managing allocation of virtual resources to a VM. In various embodiments, VMs may communicate with hypervisor(s) 301 and/or other VMs via, for example, one or more Application Programming Interfaces (APIs), shared memory, and/or other techniques.

In general, VMs 306 may provide a user of device 302 with access to resources within virtualized computing environment 300, for example, one or more programs, applications, documents, files, desktop and/or computing environments, or other resources. In some embodiments, VMs 306 may be implemented as fully virtualized VMs that are not aware that they are virtual machines (e.g., a Hardware Virtual Machine or HVM). In other embodiments, the VM may be aware that it is a virtual machine, and/or the VM may be implemented as a paravirtualized (PV) VM.

Figure 3:
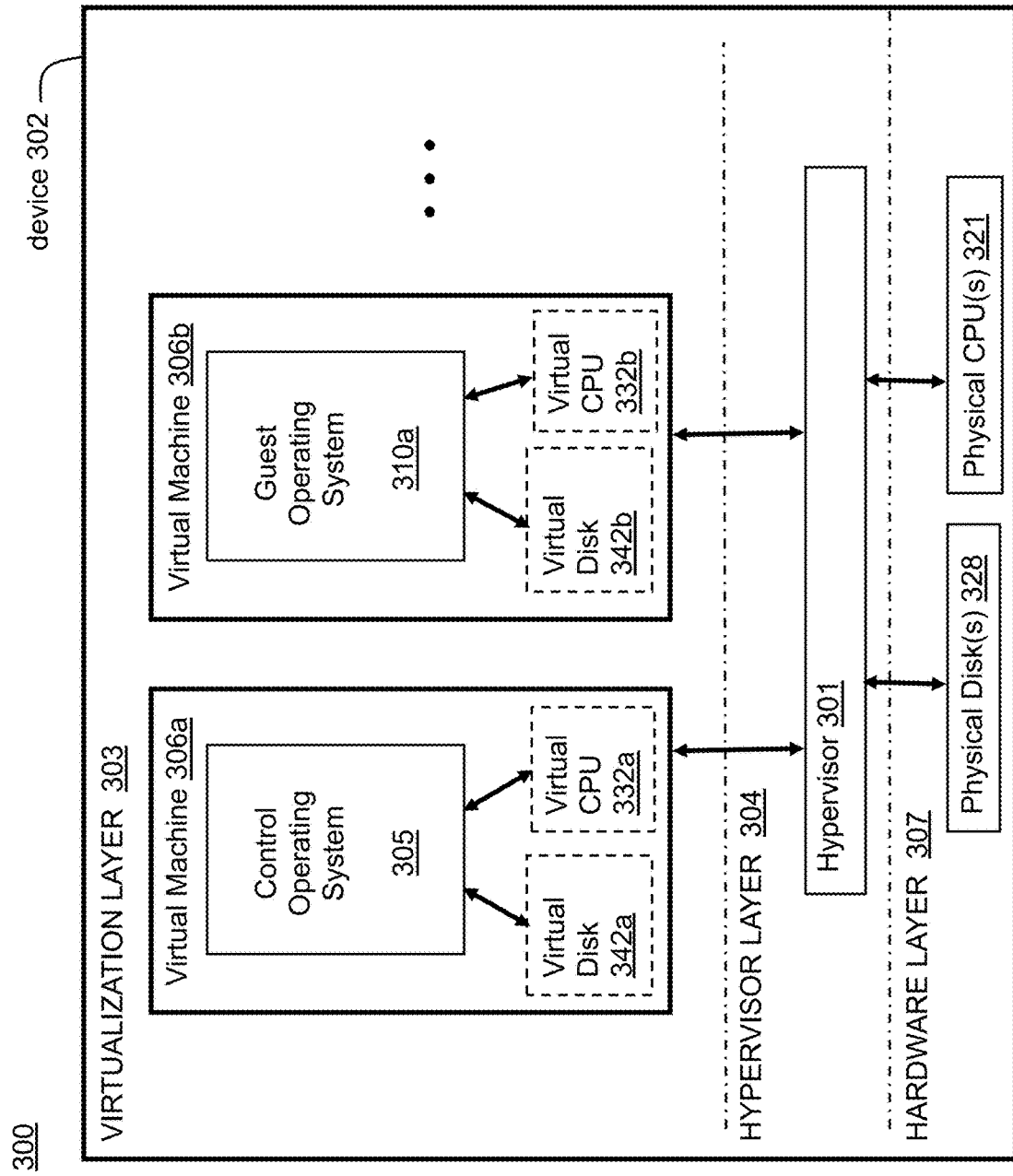
FIG. 3 is a block diagram of a virtualization environment, in accordance with an illustrative embodiment.

Although shown in FIG. 3 as including a single virtualized device 302, virtualized environment 300 may include a plurality of networked devices in a system in which at least one physical host executes a virtual machine. A device on which a VM executes may be referred to as a physical host and/or a host machine. For example, appliance 200 may be additionally or alternatively implemented in a virtualized environment 300 on any computing device, such as a client 102, server 106 or appliance 200. Virtual appliances may provide functionality for availability, performance, health monitoring, caching and compression, connection multiplexing and pooling and/or security processing (e.g., firewall, VPN, encryption/decryption, etc.), similarly as described in regard to appliance 200.

Additional details of the implementation and operation of virtualized computing environment 300 may be as described in U.S. Pat. No. 9,538,345, issued Jan. 3, 2017 to Citrix Systems, Inc. of Fort Lauderdale, Fla., the teachings of which are hereby incorporated herein by reference.

In some embodiments, a server may execute multiple virtual machines 306, for example on various cores of a multi-core processing system and/or various processors of a multiple processor device. For example, although generally shown herein as "processors" (e.g., in FIGS. 1C, 2 and 3), one or more of the processors may be implemented as either single- or multi-core processors to provide a multi-threaded, parallel architecture and/or multi-core architecture. Each processor and/or core may have or use memory that is allocated or assigned for private or local use that is only accessible by that processor/core, and/or may have or use memory that is public or shared and accessible by multiple processors/cores. Such architectures may allow work, task, load or network traffic distribution across one or more processors and/or one or more cores (e.g., by functional parallelism, data parallelism, flow-based data parallelism, etc.).

Further, instead of (or in addition to) the functionality of the cores being implemented in the form of a physical processor/core, such functionality may be implemented in a virtualized environment (e.g., 300) on a client 102, server 106 or appliance 200, such that the functionality may be implemented across multiple devices, such as a cluster of computing devices, a server farm or network of computing devices, etc. The various processors/cores may interface or communicate with each other using a variety of interface techniques, such as core to core messaging, shared memory, kernel APIs, etc.

In embodiments employing multiple processors and/or multiple processor cores, described embodiments may distribute data packets among cores or processors, for example to balance the flows across the cores. For example, packet distribution may be based upon determinations of functions performed by each core, source and destination addresses, and/or whether: a load on the associated core is above a predetermined threshold; the load on the associated core is below a predetermined threshold; the load on the associated core is less than the load on the other cores; or any other metric that can be used to determine where to forward data packets based in part on the amount of load on a processor.

For example, data packets may be distributed among cores or processes using receive-side scaling (RSS) in order to process packets using multiple processors/cores in a network. RSS generally allows packet processing to be balanced across multiple processors/cores while maintaining in-order delivery of the packets. In some embodiments, RSS may use a hashing scheme to determine a core or processor for processing a packet.

The RSS may generate hashes from any type and form of input, such as a sequence of values. This sequence of values can include any portion of the network packet, such as any header, field or payload of network packet, and include any tuples of information associated with a network packet or data flow, such as addresses and ports. The hash result or any portion thereof may be used to identify a processor, core, engine, etc., for distributing a network packet, for example via a hash table, indirection table, or other mapping technique.

Additional details of the implementation and operation of a multi-processor and/or multi-core system may be as described in U.S. Pat. No. 9,538,345, issued Jan. 3, 2017 to Citrix Systems, Inc. of Fort Lauderdale, Fla., the teachings of which are hereby incorporated herein by reference.

D. Systems and Methods for Providing a Distributed Cluster Architecture

Figure 4:
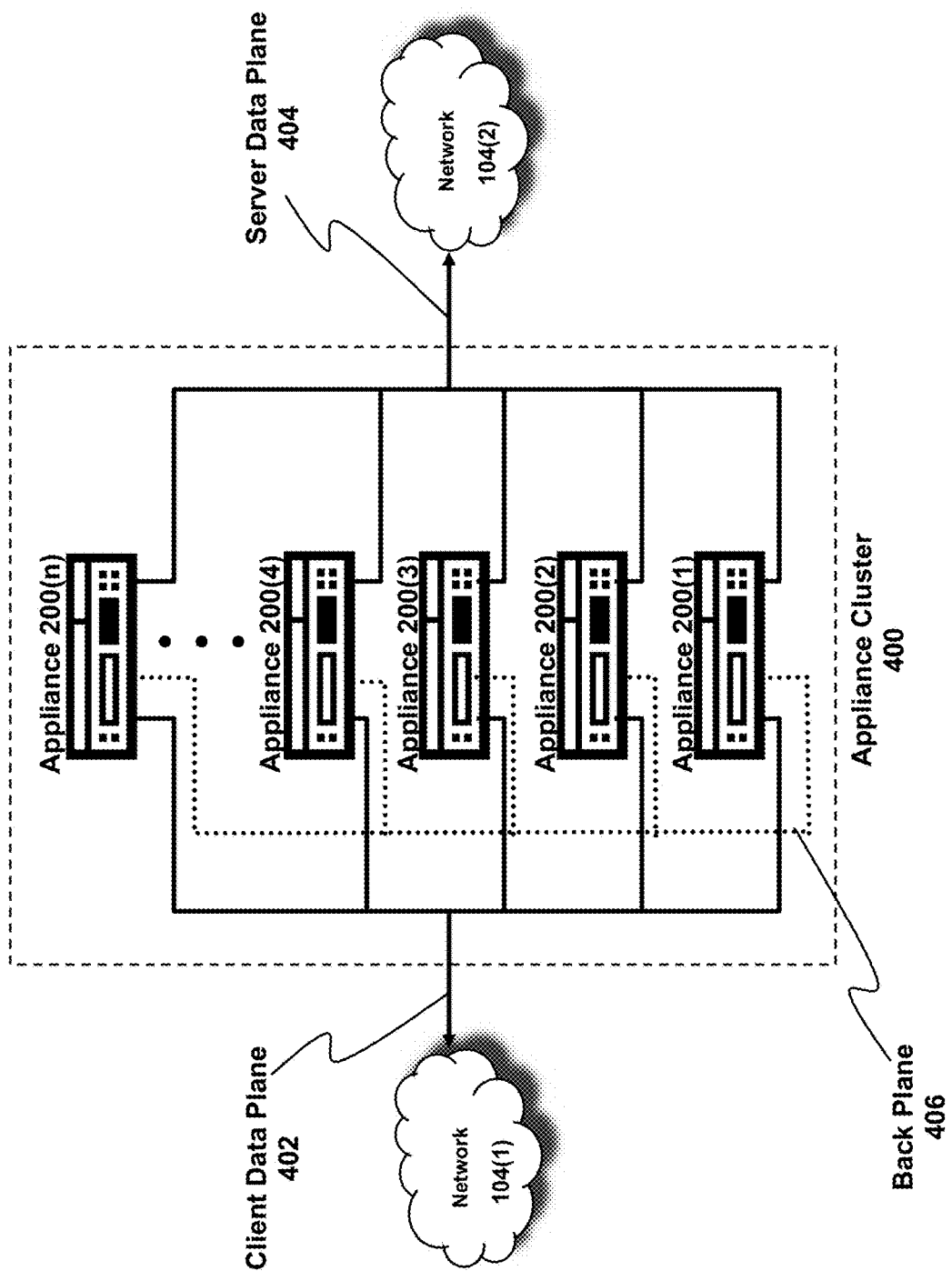
FIG. 4 is a block diagram of a cluster system, in accordance with an illustrative embodiment.

Although shown in FIGS. 1A and 1B as being single appliances, appliances 200 may be implemented as one or more distributed or clustered appliances. Individual computing devices or appliances may be referred to as nodes of the cluster. A centralized management system may perform load balancing, distribution, configuration, or other tasks to allow the nodes to operate in conjunction as a single computing system. Such a cluster may be viewed as a single virtual appliance or computing device. FIG. 4 shows a block diagram of an illustrative computing device cluster or appliance cluster 400. A plurality of appliances 200 or other computing devices (e.g., nodes) may be joined into a single cluster 400. Cluster 400 may operate as an application server, network storage server, backup service, or any other type of computing device to perform many of the functions of appliances 200 and/or 205.

In some embodiments, each appliance 200 of cluster 400 may be implemented as a multi-processor and/or multi-core appliance, as described herein. Such embodiments may employ a two-tier distribution system, with one appliance if the cluster distributing packets to nodes of the cluster, and each node distributing packets for processing to processors/cores of the node. In many embodiments, one or more of appliances 200 of cluster 400 may be physically grouped or geographically proximate to one another, such as a group of blade servers or rack mount devices in a given chassis, rack, and/or data center. In some embodiments, one or more of appliances 200 of cluster 400 may be geographically distributed, with appliances 200 not physically or geographically co-located. In such embodiments, geographically remote appliances may be joined by a dedicated network connection and/or VPN. In geographically distributed embodiments, load balancing may also account for communications latency between geographically remote appliances.

In some embodiments, cluster 400 may be considered a virtual appliance, grouped via common configuration, management, and purpose, rather than as a physical group. For example, an appliance cluster may comprise a plurality of virtual machines or processes executed by one or more servers.

As shown in FIG. 4, appliance cluster 400 may be coupled to a first network 104(1) via client data plane 402, for example to transfer data between clients 102 and appliance cluster 400. Client data plane 402 may be implemented a switch, hub, router, or other similar network device internal or external to cluster 400 to distribute traffic across the nodes of cluster 400. For example, traffic distribution may be performed based on equal-cost multi-path (ECMP) routing with next hops configured with appliances or nodes of the cluster, open-shortest path first (OSPF), stateless hash-based traffic distribution, link aggregation (LAG) protocols, or any other type and form of flow distribution, load balancing, and routing.

Appliance cluster 400 may be coupled to a second network 104(2) via server data plane 404. Similarly to client data plane 402, server data plane 404 may be implemented as a switch, hub, router, or other network device that may be internal or external to cluster 400. In some embodiments, client data plane 402 and server data plane 404 may be merged or combined into a single device.

In some embodiments, each appliance 200 of cluster 400 may be connected via an internal communication network or back plane 406. Back plane 406 may enable inter-node or inter-appliance control and configuration messages, for inter-node forwarding of traffic, and/or for communicating configuration and control traffic from an administrator or user to cluster 400. In some embodiments, back plane 406 may be a physical network, a VPN or tunnel, or a combination thereof.

Additional details of cluster 400 may be as described in U.S. Pat. No. 9,538,345, issued Jan. 3, 2017 to Citrix Systems, Inc. of Fort Lauderdale, Fla., the teachings of which are hereby incorporated herein by reference.

E. Systems and Methods for Adaptive Adjustment of UDT Packet Sizes Based on Network Conditions The user datagram protocol (UDP)-based data transfer (UDT) protocol is typically used for large data transfers over high speed or long distance networks, for which standard transport control protocols (TCP) do not scale well, particularly in high bandwidth-delay product (BDP) environments. UDT protocols make more effective use of the available bandwidth in such instances, but have some drawbacks. Specifically, some packet sizes of UDT packets may be dropped or lost in transmit due to various filtering or other policy rules applied by intermediary devices, such as proxies or virtual private network (VPN) gateways.

For example, in some implementations, some network systems may not route or forward UDP packets of certain size ranges (e.g. between 1420-1428 bytes, for example, or any other such range, sometimes referred to as a 'black hole'), while properly routing both larger and smaller packets. As these dropped packet sizes may be smaller than a maximum transmission unit (MTU) of the connection and larger packets may be communicated successfully, limiting the MTU value to less than the dropped packet size (e.g. 1419 bytes) may sacrifice usable bandwidth. Similarly, in some implementations, if a packet exceeds the MTU size and is fragmented for transmission, intermediary devices such as proxies or VPNs may not properly transmit the fragments in order or may not reassemble the fragmented packets properly, resulting in lost data.

While UDT includes reliability features providing retransmissions of lost packets, in instances such as the above, this may result in complete communications breakdown: if a packet matching the 'black hole' size is lost, the recipient device may transmit a negative acknowledgement (nak) to the sender to request retransmission (or a retransmission timer of the sender device may expire without the sender having received an acknowledgement (ack), and the packet may be retransmitted). However, as the retransmitted packet is the same size as the lost packet, it may similarly be lost or dropped by an intermediary device. These retransmissions may be performed repeatedly (e.g. until a communications timeout or other interruption), particularly where naks are successfully communicated between the receiver and sender, implying that the network communication path is healthy.

Furthermore, some implementations of congestion avoidance protocols may result in drastic reductions of bandwidth responsive to dropped packets. For example, a system may reduce a congestion window size to a size smaller than the dropped packet, requiring fragmentation of larger packets for retransmission. Because congestion avoidance systems typically slowly increase window sizes, the system may incur long delays before it can resume transfer of packet sizes exceeding the dropped packet size or range. Additionally, if during the window increasing process, a packet matches the size or range and is dropped, the congestion avoidance mechanism may restart; as a result, the system may never recover and utilize larger window sizes.

As noted above, these issues may be difficult to diagnose, as smaller keep-alive packets (e.g. typically smaller than the dropped packet size or range) may be successfully communicated between the endpoints, leading to an illusion that the network path is able to transport all packet sizes below the MTU value.

To address the deficiencies noted above, in some implementations, a system may implement adaptive packet size adjustment for UDT or similar protocols, responsive to actual network conditions. Upon detection of a 'black hole' or a size or range of sizes of packets that are repeatedly lost, the system may subdivide packets matching the size or range into smaller subpackets. The receiving device may receive each subpacket and reassemble the original packet, allowing successful communication. Other packets, both smaller and larger than the identified size or range, may be transmitted normally, avoiding drastic reductions to congestion windows or application of other congestion avoidance features, or reducing the MTU value to avoid the 'black hole' range while sacrificing overall useable bandwidth. As a result, the system may more efficiently and reliably communicate large data payloads.

Figure 5:
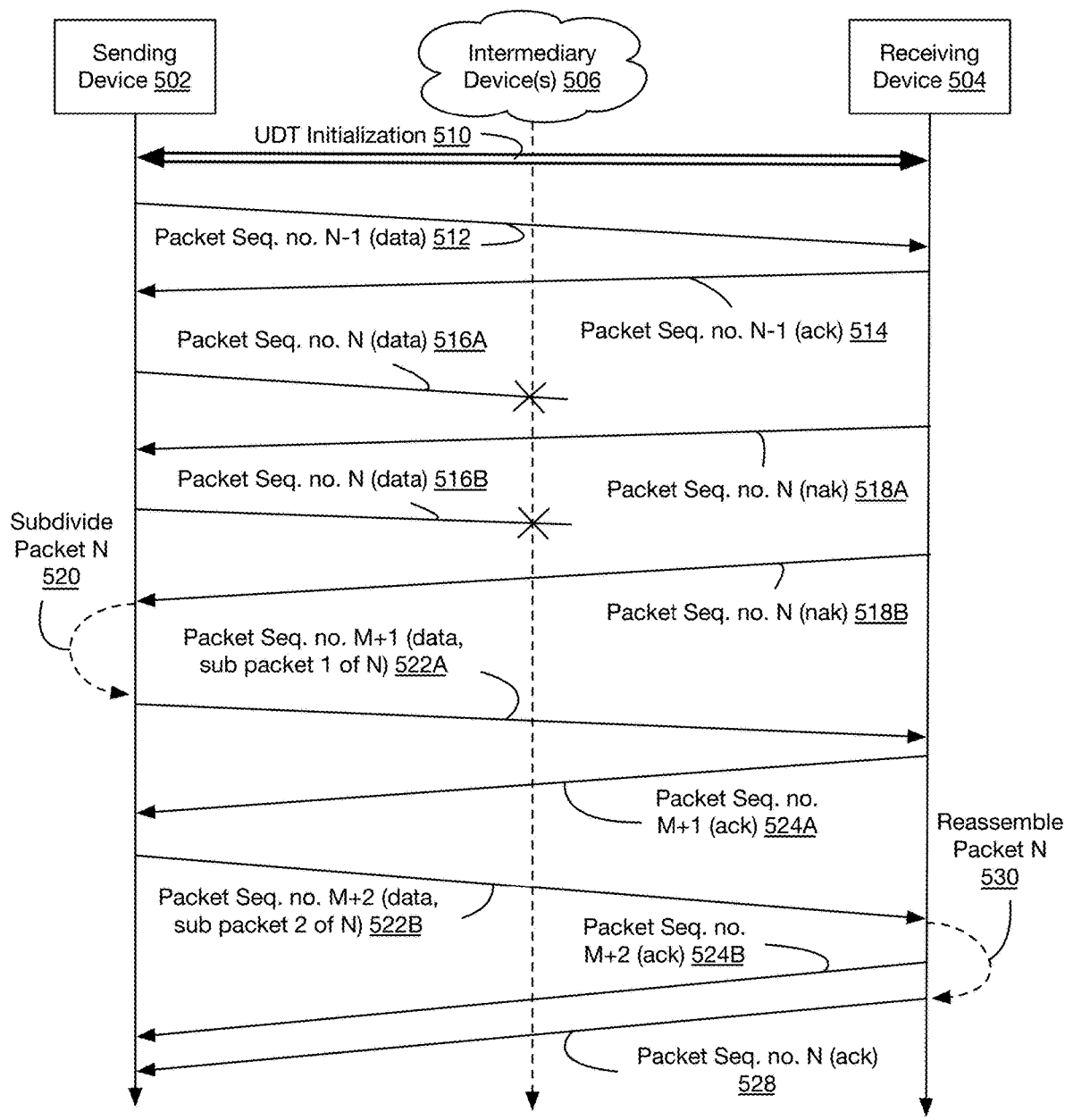
FIG. 5 is a signal flow diagram of an implementation of a system for adaptive adjustment of UDT packet sizes based on network conditions.

Referring to FIG. 5, a sending device 502, which may comprise any of the devices discussed above, such as a desktop computer, laptop computer, workstation, tablet computer, smart phone, server, appliance, network accelerator, or other device, may communicate via a network with a receiving device 504, which may similarly comprise any of the devices discussed above. The network may comprise a local area network, wide area network, or a combination of local and wide area networks, and the communications may traverse one or more intermediary devices 206, which may similarly comprise any type and form of computing device (e.g. proxies, firewalls, VPN gateways, routers, switches, accelerators, load balancers, security devices, etc.).

At step 510, the sending device 502 and receiving device 504 may establish communications and initialize a UDT session (or any other similar protocol). Establishing the session may comprise setting parameters for the communication, including starting sequence numbers, window sizes, MTU sizes, etc.

At step 512, the sending device 502 may send a data packet (e.g. with sequence number N−1, in the illustrated example) to the receiving device 504. Other packets (not illustrated) may have been previously sent, e.g. during a data transfer as packet sizes are increased during a slow start algorithm or other congestion avoidance mechanism. The packet is successfully received, and at step 514, the receiving device 504 may send an acknowledgement packet with sequence number N−1 to the sending device 502. Although shown sequentially for a single packet, in many implementations, a plurality of packets may be transmitted prior to receipt of an acknowledgment, and in some implementations, the acknowledgement may include a plurality of sequence identifiers and/or a sequence identifier of a most recently received or highest sequence number packet.

As shown, the communication of the packet N−1 at step 512 is successful, potentially due to it having a size greater than or less than a 'black hole' that may cause an intermediary device to drop the packet. By contrast, at step 516A, the sending device transmits a packet with sequence N that is lost. This packet may have a size within a drop window or that is otherwise adversely affected by an intermediary device, causing the packet to be lost. In some implementations, this may be due to a congestion avoidance or slow start mechanism: the prior packet, during bandwidth ramp up, may be smaller than the drop window, while packet N is increased in size to fall within the drop window.

At step 518A, in some implementations, the receiving device 504 may send a negative acknowledgement for the packet. In other implementations, the receiving device may not send a negative acknowledgement (or a negative acknowledgement may be lost), but the sending device may not receive an acknowledgement within a specified timeout window. Responsive to either receiving a negative acknowledgement or a timeout expiration, at step 518B, the sending device 502 may retransmit the packet N to the receiving device. Because the retransmitted packet is the same size as the original transmission of the packet, it may be similarly dropped by an intermediary device. The receiving device 504 may again retransmit a negative acknowledgement at step 518B, or the sending device may again have a timeout window expire, and may re-retransmit the packet (not illustrated). In some implementations, this sequence of attempted transmissions and timeouts or negative acknowledgements may be repeated multiple times (not illustrated) until a transmission timeout (longer than the retransmission timer, and typically allowing a number of retransmissions prior to expiration) expires. The data transfer may fail, and may need to be restarted from the beginning. This may potentially run into the same problem if some packets of the restarted data transfer end up having the same size as the dropped packets. As discussed above, diagnosis of such issues may be particularly difficult because packets of other sizes may be successfully transmitted (including acks and naks as shown, as well as packets that have other lengths due to congestion avoidance or fragmentation algorithms).

Instead, to avoid these packet size-related drops, at step 520, responsive to receipt of the negative acknowledgement or expiration of a retransmission timeout (or responsive to a number of negative acknowledgements or retransmission timer expirations for a packet exceeding a threshold, in some implementations), the sending device 502 may subdivide the packet into a plurality of subpackets. In some implementations, the sending device 502 may divide the packet into two half-sized subpackets, while in other implementations, other lengths may be used (e.g. three third-sized subpackets, four quarter-sized subpackets, two subpackets of unequal lengths such as 35% and 65% of the original packet length, etc.). The subpackets may have different sequence numbers from the original packet, in order to distinguish them from the normal data stream. For example, the subpackets may have sequence numbers starting at N+1000, N+5000, or any other such number. In other implementations, the subpackets may have the same sequence number as the original packet, but be otherwise distinguished (e.g. by inclusion of a subpacket index identifier in an options field of a header or beginning of a payload, or other such information). In many implementations, subpackets may have both a different sequence number than the original packet and also include a subpacket index identifier or other such indicator to indicate that they are subpackets and, in some implementations, the order in which their payloads should be reassembled by the receiver device 504.

The subpackets may be transmitted at steps 522A, 522B as shown, and, because they are smaller than the original packet, may be communicated successfully without being dropped by an intermediary device 506; each subpacket may be acknowledged by the receiver device (e.g. at steps 524A, 524B). Although shown with successful communications, in many implementations, subpackets may also be retransmitted due to packet loss (e.g. responsive to receipt of a negative acknowledgement or a retransmission timeout). These losses may be unrelated to the 'black hole' size-related loss, and may be due to interference, congestion, noise, or other connection characteristics. However, if the original transmission or a retransmission is successful, then communications may proceed.

At step 530, the receiving device 504 may reassemble the original packet from the subpackets. Reassembling the original packet may comprise concatenating payloads of the subpackets into a single packet, extracting or determining a sequence number of the original packet from the subpackets. In some implementations, their sequence numbers may include an index identifier, with a sequence number equal to [sequence number of original packet]+[index number of subpacket, e.g. 0, 1, 2, 3, etc.]+[offset, e.g. 1000, 5000, or any other such value]. The original sequence number may be retrieved by subtracting the offset and index number from the subpacket. In some implementations, because the offset may be both significantly larger than the subpacket index numbers and a predetermined value (e.g. 10000), the subpacket may not need to explicitly include the index numbers (e.g. in an options field or payload). For example, after failing to receive a packet with sequence 1000 (and potentially providing a negative acknowledgement for sequence number 1000), and subsequently receiving packets with sequence numbers 11000, 11001, 11002, the receiver may determine that these packets are subpackets with respective indices 0, 1, 2; subtract the predetermined offset (e.g. 10000); and identify that each packet is a subpacket of original packet 1000. In other implementations, the sequence number and/or index number may explicitly included in the subpacket. For example, a payload of a subpacket may comprise an identifier indicating that the packet is a subpacket; a sequence number of the original packet; an index number; and a portion of the payload of the original packet. Because the subpackets are significantly smaller than the original packet (e.g. half the size for two subpackets), the inclusion of a few bytes of additional data in the payload may be negligible for avoiding size related 'black holes'.

In some implementations, the index number and/or another portion of the header of the subpacket may include an identification of a total number of subpackets. For example, a subpacket may include an identifier or other string indicating that it is the first of three subpackets (e.g. "1 of 3" or "1/3", etc.). By including an identifier of a total number of subpackets, in some implementations, the receiving device may begin reassembling the original packet as soon as the total number of subpackets have been received. In other implementations, the total number of subpackets may be more implicitly identified. For example, in one implementation, the subpacket index number may be decremented for each subpacket from a total number of subpackets to be sent (e.g. the subpacket index number may thus indicate a total number of subpackets remaining). For example, a first subpacket may have an index number of 2; a second subpacket have an index number of 1; and a third subpacket may have an index number of 0, indicating no further subpackets are being transmitted, and the receiver may reassemble the original packet. In other implementations, the subpackets may not include an index number; rather, the first subpacket may include a "beginning of subpackets" identifier, and/or the last subpacket may include an "end of subpackets" identifier. These identifiers may be as simple as a one or two-bit flag in a header (e.g. 10 for first subpacket, 00 for intermediate subpackets, and 01 for end subpacket, or any other formulation). The subpackets may be ordered for reassembly based on sequence numbers; or, in implementations where the original packet is divided into only two subpackets, a single bit flag may be used to identify either the first or last subpacket. In any of these implementations, the receiving device may not need to wait for a timeout or other expiration to determine whether more subpackets are forthcoming before reassembling the original packet.

Once reassembled, the receiving device 504 may, in some implementations, transmit an acknowledgement of the original packet to the sending device 502 at step 528. Communications may then proceed normally. However, to avoid future issues with the same packet size and intermediary devices dropping the packet, the sending device 502 may add the packet size to a transmission filter (or a range around the packet size, such as a ±5 byte offset, in some implementations, such that the filter would include a range from 1420-1430 for an original packet of size 1425 bytes that was dropped, or any other such size window). Subsequently, prior to transmission of a packet, the sending device 502 may compare the size of the packet to be transmitted with the transmission filter window sizes. If the packet size falls within a window or is equivalent to a filtered size, then the sending device 502 may subdivide the packet and transmit the subpackets as at steps 520-530, avoiding the original transmission and retransmission at steps 516-518 that are likely to fail.

To reduce processing and memory requirements, in many implementations, the transmission filter sizes or windows may be combined in case of overlaps. For example, if a transmission filter includes a size window from 1420-1430 bytes, and a subsequent packet of 1432 bytes is dropped, rather than having two filters (e.g. 1420-1430 and 1422-1432 bytes), the windows may be combined into a single window (e.g. 1420-1432 bytes). This may reduce the number of size comparisons to be performed prior to transmission, reducing delays. In some implementations, the transmission filter may also include a maximum size (e.g. MTU size or a window size set according to a congestion avoidance algorithm).

Each of the above-mentioned elements or entities is implemented in hardware, or a combination of hardware and software, in one or more embodiments. Each component of the system 1100 may be implemented using hardware or a combination of hardware or software detailed above in connection with FIG. 1. For instance, each of these elements or entities can include any application, program, library, script, task, service, process or any type and form of executable instructions executing on hardware of a client device (e.g., the client applications 404). The hardware includes circuitry such as one or more processors in one or more embodiments.

Figure 6:
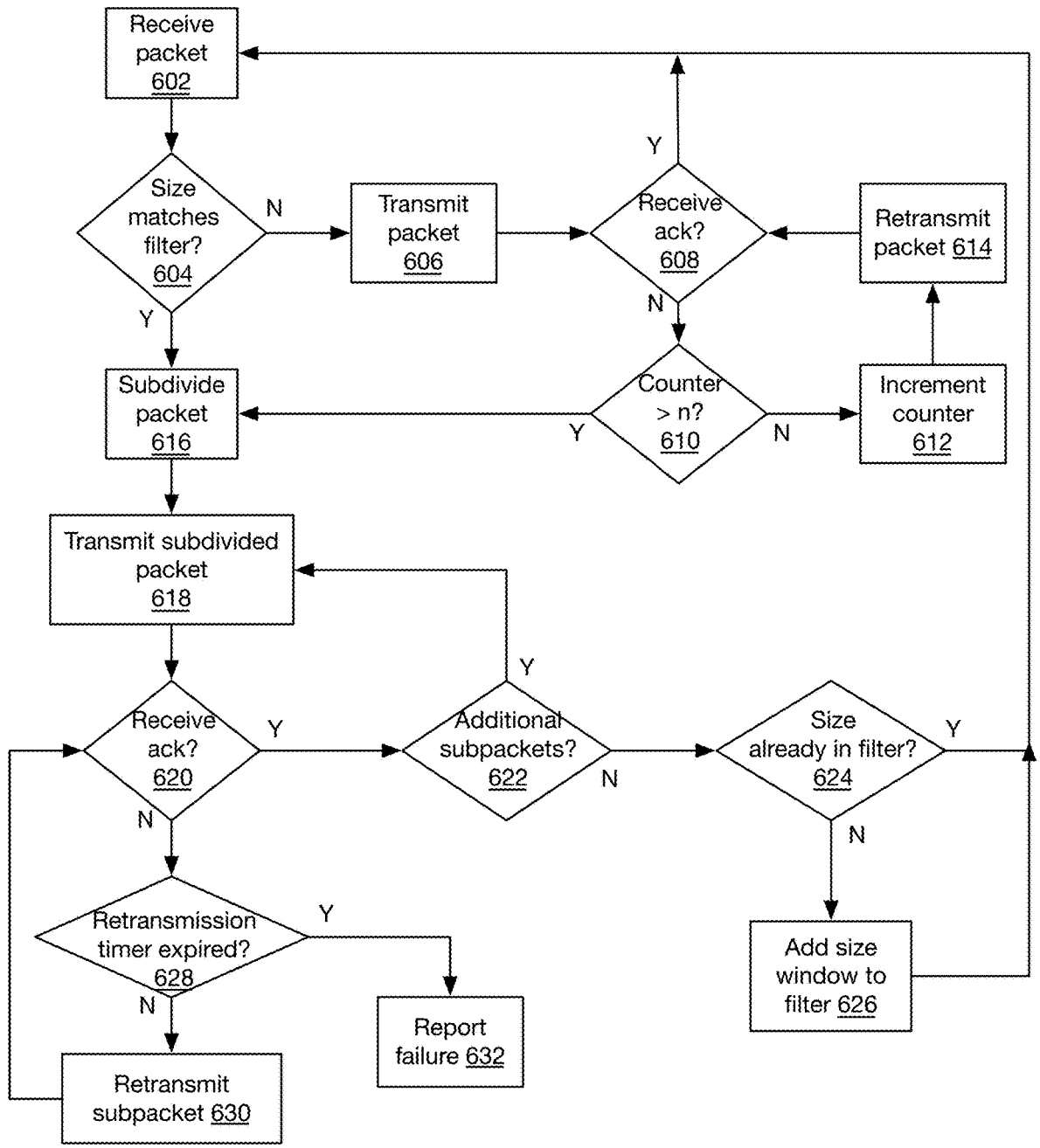
FIG. 6 is a flow chart of an implementation of a method for adaptive adjustment of UDT packet sizes based on network conditions.

FIG. 6 is a flow chart of an implementation of a method for adaptive adjustment of UDT packet sizes based on network conditions. At step 602, a first device may receive a packet for transmission to a second device. The packet may be locally generated and received from an application or network stack of the device, or may be received from another device (e.g. in implementations in which the first device is an intermediary, such as a network accelerator, appliance, gateway, server, or other such device). The first device may perform any processing necessary on the packet, such as compression, encryption, network address translation, fragmentation, or other such features.

At step 604, the first device may compare a size of the packet to a transmission filter. The transmission filter may comprise a maximum size (e.g. MTU, congestion window size, etc.), and may comprise one or more packet size windows or values corresponding to packets that have been dropped during transmission. The windows may be based on an offset around a size of a packet that has been dropped, such as ±5 bytes, ±10 bytes, ±3 bytes, or any other such value.

If the size does not match an existing filter, then at step 606, the first device may transmit the packet to a recipient device. The transmission may be via one or more intermediary devices such as network components of a local and/or wide area network between the sending device and recipient device.

At step 608, the first device may determine whether it has received an acknowledgement for the packet. Although shown after step 606, in many implementations, steps 602-606 may be repeated for multiple packets before an acknowledgement for the first packet is received. If an acknowledgement is received, the steps 602-608 may be repeated for further packets.

If an acknowledgement has not been received prior to expiration of a timeout, or if a negative acknowledgement (nak) is received, then in some implementations at step 610, the first device may determine if a retransmission counter for the packet exceeds a threshold n. The threshold may be preconfigured or set by an administrator or user, or may be dynamically adjusted (e.g. based on bandwidth and/or delays of the communication path between the sender and recipient, for example to allow for multiple retransmissions to be "in flight").

If the counter does not exceed the threshold, then at step 612, the retransmission counter may be incremented, and at step 614, the packet may be retransmitted. Steps 608-614 may be repeated iteratively until either an acknowledgment for the packet has been received at step 608 or the retransmission counter exceeds the threshold at step 610.

If the retransmission counter exceeds the threshold without an acknowledgement having been received for the packet or a retransmission of the packet, then at step 616, the first device may subdivide the packet into a plurality of subpackets. As discussed above, the subpackets may have equal sizes or unequal sizes. The packet may be divided into any number of subpackets, such as two, three, four, or more. As discussed above, subdividing the packet may comprise generating subpackets having a portion of a payload of the original packet, a sequence number of the original packet or a sequence number based on the sequence number of the original packet (e.g. with an offset), and, in some implementations, a subpacket index value identifying an order in which the subpacket payloads should be concatenated (e.g. 0, 1, 2, etc.). Additional information may be included in the subpacket, such as an identifier that the packet is a subpacket. The additional information and/or index value may be placed in an options field in a header of the subpacket or a payload of the packet (e.g. before the data payload extracted from the original packet).

At step 618, the first device may transmit a subdivided packet. The transmission may be via the same path and protocol as the transmission of the original packet (albeit with a smaller packet size). At step 620, the device may determine whether it has received an acknowledgement for the packet. As discussed above, in some implementations, the sending device may receive an acknowledgement, while in other implementations, a retransmission timeout may pass without the sending device receiving a negative acknowledgement. If an acknowledgement has been received, in many implementations, at step 622, additional subpackets may remain to be transmitted, and steps 618-622 may be iteratively repeated. In some implementations, as discussed above, several subpackets may be transmitted prior to receiving an acknowledgement for the first packet, such that several packets are "in flight". Thus, in such implementations, step 618 may be repeated several times before step 620 is performed.

Once all subpackets have been transmitted, if acknowledgements have been received for each subpacket, then at step 624, the sending device may determine whether a size window corresponding to the original packet exists in a transmission filter of the device. As discussed above, the size window may be a single size (e.g. 1425 bytes), or may be a range based on an offset (e.g. ±5 bytes, or 1420 bytes to 1430 bytes). If the filter includes the size or a window including the size, then the method may return to step 602. This may occur, for example, when a packet of the size has already been transmitted; dropped; and successfully resent as subpackets—subsequent packets may match the filter at step 604, and be subdivided and transmitted at steps 616-622. If the filter does not currently include the size or a window comprising the size, at step 626, the size or a window corresponding to the size may be added to the transmission filter. As discussed above, to reduce the number of filters, in some implementations, if the new filter window would overlap with another existing filter window, the two windows may be combined into a larger window.

If an acknowledgement is not received for the subpacket(s) at step 620, then the connection may be impaired. Accordingly, in some implementations, at step 628, the first device may determine whether a retransmission timer has expired; if not, then at step 630, the subpacket may be retransmitted, and steps 620-630 may be iteratively repeated until the subpacket is either acknowledged at step 622, or the retransmission timer expires. If the retransmission timer expires, then at step 632, the first device may report failure of communication of the data, and may, in some implementations, terminate communications, transmit an error report, and/or attempt to restart the data transfer.

Thus, the systems and methods discussed herein implement adaptive packet size adjustment for UDT or similar protocols, responsive to actual network conditions. Upon detection of a 'black hole' or a size or range of sizes of packets that are repeatedly lost, the system may subdivide packets matching the size or range into smaller subpackets. The receiving device may receive each subpacket and reassemble the original packet, allowing successful communication. Other packets, both smaller and larger than the identified size or range, may be transmitted normally, avoiding drastic reductions to congestion windows or application of other congestion avoidance features, or reducing the MTU value to avoid the 'black hole' range while sacrificing overall useable bandwidth. As a result, the system may more efficiently and reliably communicate large data payloads.

Various elements, which are described herein in the context of one or more embodiments, may be provided separately or in any suitable subcombination. For example, the processes described herein may be implemented in hardware, software, or a combination thereof. Further, the processes described herein are not limited to the specific embodiments described. For example, the processes described herein are not limited to the specific processing order described herein and, rather, process blocks may be re-ordered, combined, removed, or performed in parallel or in serial, as necessary, to achieve the results set forth herein.

It will be further understood that various changes in the details, materials, and arrangements of the parts that have been described and illustrated herein may be made by those skilled in the art without departing from the scope of the following claims.

I claim:

1. A method for adaptive packet sizing, comprising:
   transmitting, by a first device to a second device, a first packet having a first size;
   receiving, by the first device from the second device, a negative acknowledgement for the first packet;
   determining, by the first device, that a number of received negative acknowledgements for the first packet exceeds a threshold;
   adding, by the first device, a first size window corresponding to the first size to a transmission filter, the transmission filter preventing transmission of packets having a size corresponding to the first size window;
   generating, by the first device, a first subpacket and a second subpacket from the first packet, responsive to determining that the number of received negative acknowledgements for the first packet exceeds the threshold; and
   transmitting, by the first device to the second device, the first subpacket and the second subpacket.

2. The method of claim 1, further comprising receiving, by the first device from the second device, an acknowledgement sent responsive to receipt of the first subpacket and the second subpacket; and
   wherein adding the first size window to the transmission filter is performed responsive to receipt of the acknowledgement sent responsive to receipt of the first subpacket and the second subpacket.

3. The method of claim 2, wherein the acknowledgement includes a sequence number of the first packet.

4. The method of claim 3, wherein generating the first subpacket and the second subpacket each further comprise generating a subpacket comprising a portion of a payload the first packet, a sequence number of the first packet, and a subpacket index value.

5. The method of claim 1, further comprising:
   receiving, by the first device, a second packet having a second size corresponding to the first size window;
   generating, by the first device, a third subpacket and a fourth subpacket from the second packet, responsive to the transmission filter including the first size window corresponding to the second size; and
   transmitting, by the first device to the second device, the third subpacket and the fourth subpacket.

6. The method of claim 1, wherein the first size window comprises the first size plus and minus a predetermined offset size.

7. The method of claim 1, wherein the first packet comprises a user datagram protocol (UDP)-based data transfer protocol (UDT) packet.

8. The method of claim 1, wherein the first size is less than a maximum transmission unit (MTU) size of a connection between the first device and the second device.

9. A system for adaptive packet sizing, comprising:
   a first device comprising a network interface in communication with a second device, and a memory device comprising a transmission filter;
   wherein the first device is configured to:
   transmit, to the second device via the network interface, a first packet having a first size,
   receive, from the second device, a negative acknowledgement for the first packet,
   determine that a number of received negative acknowledgements for the first packet exceeds a threshold,
   add a first size window corresponding to the first size to the transmission filter, the transmission filter preventing transmission of packets having a size corresponding to the first size window,
   generate a first subpacket and a second subpacket from the first packet, responsive to determining that the number of received negative acknowledgements for the first packet exceeds the threshold; and
   transmit, to the second device, the first subpacket and the second subpacket.

10. The system of claim 9, wherein the first device is further configured to:

receive, from the second device, an acknowledgement sent responsive to receipt of the first subpacket and the second subpacket; and add the first size window to the transmission filter responsive to receipt of the acknowledgement sent responsive to receipt of the first subpacket and the second subpacket.

11. The system of claim 10, wherein the acknowledgement includes a sequence number of the first packet.

12. The system of claim 11, wherein the first device is further configured to generate each of the first subpacket and the second subpacket by generating a subpacket comprising a portion of a payload the first packet, a sequence number of the first packet, and a subpacket index value.

13. The system of claim 9, wherein the first device is further configured to:
receive a second packet having a second size corresponding to the first size window;
generate a third subpacket and a fourth subpacket from the second packet, responsive to the transmission filter including the first size window corresponding to the second size; and
transmit, to the second device, the third subpacket and the fourth subpacket.

14. The system of claim 9, wherein the first size window comprises the first size plus and minus a predetermined offset size.

15. The system of claim 9, wherein the first packet comprises a user datagram protocol (UDP)-based data transfer protocol (UDT) packet.

16. The system of claim 9, wherein the first size is less than a maximum transmission unit (MTU) size of a connection between the first device and the second device.

17. A method for adaptive packet sizing, comprising:
determining, by a first device, that a transmission of a first packet from a second device to the first device has not been received, the first packet having a first sequence number;
transmitting, by the first device to the second device, a negative acknowledgement comprising the first sequence number;
receiving, by the first device from the second device, a first subpacket and a second subpacket generated from the first packet, each of the first subpacket and the second subpacket comprising the first sequence number and a subpacket index value, the first subpacket and second subpacket transmitted by the second device responsive to a determination that the number of received negative acknowledgements for the first packet exceeds a threshold;
reassembling the first packet, by the first device, from the first subpacket and the second subpacket according to the subpacket index value of each subpacket; and
responsive to reassembling the first packet, transmitting, by the first device to the second device, an acknowledgement comprising the first sequence number;
wherein receipt of the acknowledgment comprising the first sequence number causes the second device to add a first size window corresponding to a size of the first packet to a transmission filter;
reassembling the second packet, by the first device, from the third subpacket and the fourth subpacket according to the subpacket index value of each subpacket; and
responsive to reassembling the second packet, transmitting, by the first device to the second device, an acknowledgement comprising the second sequence number.

18. The method of claim 17, further comprising:
receiving, by the first device from the second device, a third subpacket and a fourth subpacket generated from a second packet not previously transmitted from the second device, each of the third subpacket and the fourth subpacket comprising a second sequence number and a subpacket index value, the second packet having a size corresponding to the first size window;
reassembling the second packet, by the first device, from the third subpacket and the fourth subpacket according to the subpacket index value of each subpacket; and
responsive to reassembling the second packet, transmitting, by the first device to the second device, an acknowledgement comprising the second sequence number.

* * * * *